United States Patent

[11] 3,598,142

| [72] | Inventor | Benjamin R. Neier<br>East Wyatt Earp & Highway 50, Dodge City, Kans. 67801 |
|---|---|---|
| [21] | Appl. No. | 832,207 |
| [22] | Filed | June 11, 1969 |
| [45] | Patented | Aug. 10, 1971 |

[54] SELF-PROPELLED IRRIGATION SYSTEM
13 Claims, 8 Drawing Figs.

[52] U.S. Cl. .................................................. 137/344, 239/212
[51] Int. Cl. ..................................................... B05b 9/02, E01h 3/02
[50] Field of Search ........................................ 239/212, 213

[56] References Cited
UNITED STATES PATENTS

| 2,516,711 | 7/1950 | Mansur | 239/212 X |
| 2,796,292 | 6/1957 | Maggart | 239/213 |
| 2,800,364 | 7/1957 | Dick et al. | 239/212 X |
| 2,807,500 | 9/1957 | Clayton | 239/212 X |
| 2,941,727 | 6/1960 | Zybach | 239/212 X |
| 3,259,319 | 7/1966 | Wallace | 239/212 X |
| 3,394,729 | 7/1968 | Bower et al. | 239/212 X |
| 3,417,766 | 12/1968 | Purtell | 239/212 X |
| 3,465,766 | 9/1969 | Siebert | 137/344 X |

*Primary Examiner*—Samuel Scott
*Attorney*—Fishburn, Gold and Litman

ABSTRACT: A self-propelled irrigation system has a plurality of radially spaced intermediate mobile units and an end mobile unit supporting an elongated water-distribution pipe which is connected to a central water-supply pipe. Drive means carried by each intermediate and end mobile unit are operatively connected thereto for moving said distribution pipe around the central supply pipe as an axis. Sleeve joint means are at each intermediate mobile unit permitting controlled transverse movement and radial extension and contraction of the distribution pipe at each of the intermediate mobile units. Control means, carried by each intermediate mobile unit, responsive to relative movement of adjacent mobile units regulate the respective drive means and the travel speed of the respective mobile unit. The control means also have a switch carried by each intermediate mobile unit with each switch being operatively connected to a motor to stop said motor from supplying power to the drive means in response to relative movement between adjacent mobile units beyond selected limits.

PATENTED AUG 10 1971

INVENTOR.
BENJAMIN R. NEIER

BY
*Fishburn, Gold & Litman*

ATTORNEYS

SELF-PROPELLED IRRIGATION SYSTEM

This invention relates to self-propelled irrigation systems and more particularly to self-propelled irrigation systems having an elongated distribution pipe which is radially extendable and contractable and having means for adjusting the speed of intermediate mobile support units supporting the distribution pipe in response to transverse movement of the pipe at each intermediate support unit to correct resulting misalignment of the pipe and support units.

The principal objects of the present invention are: to provide a self-propelled irrigation system having an elongated distribution pipe which is radially extendable and contractable within selected limits and having means for adjusting the relative travel speed of a plurality of intermediate mobile support units supporting the distribution pipe; to provide such a self-propelled irrigation system having control means carried by each intermediate mobile support unit for adjusting the travel speed thereof in response to relative position of adjacent mobile units; to provide such a self-propelled irrigation system having control means carried by each intermediate mobile unit for stopping the irrigation system in response to relative movement between adjacent mobile units beyond selected limits; to provide such a self-propelled irrigation system which is economical to manufacture, easily installed, easily maintained, simple to operate, positive and efficient in operation and particularly well suited for the proposed use.

Other objects and advantages of this invention will become apparent from the following description taken in connection with the accompanying drawings wherein are set forth by way of illustration and example certain embodiments of this invention.

Figure 1:
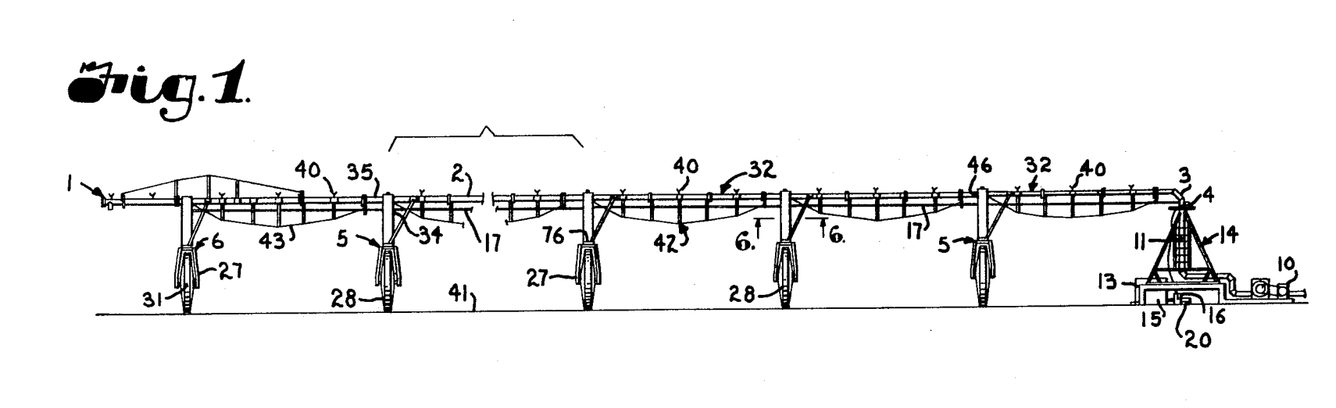
FIG. 1 is a front elevational view of a self-propelled irrigation system embodying features of the present invention.

Referring more in detail to the drawings:

The reference numeral 1 generally designates a self-propelled irrigation system having an elongated water-distribution pipe 2 with one end thereof connected to a central water-supply pipe 3 for receiving water or other irrigation fluid therefrom and for travel around a swivel connection 4 with the central water-supply pipe 3 as an axis. A plurality of intermediate mobile support units 5 and an end mobile support unit 6 are laterally spaced along a line defined by the pipe 2 and support same during said travel around the swivel connection 4. Joint means 7 in the water-distribution pipe 2 at each of the intermediate mobile support units 4 permits controlled relative movement of sections of the distribution pipe 2 at each of the intermediate mobile support units 5.

The joint means 7 permits longitudinal or radial extension and contraction of the distribution pipe 2 at each of the intermediate mobile support units 5 to lead or trail adjacent mobile support units during travel around the central water-supply pipe swivel connection 4 and to be above or below adjacent mobile support units due to travel over uneven terrain. The self-propelled irrigation system 1 has drive means 8 operative to drive each intermediate mobile support unit 5 and the end mobile support unit 6 with the drive means 8 being regulated by control means 9, as later described, in response to movement of the distribution pipe 2 at the respective mobile support units 5 and 6.

Figures 5, 7:
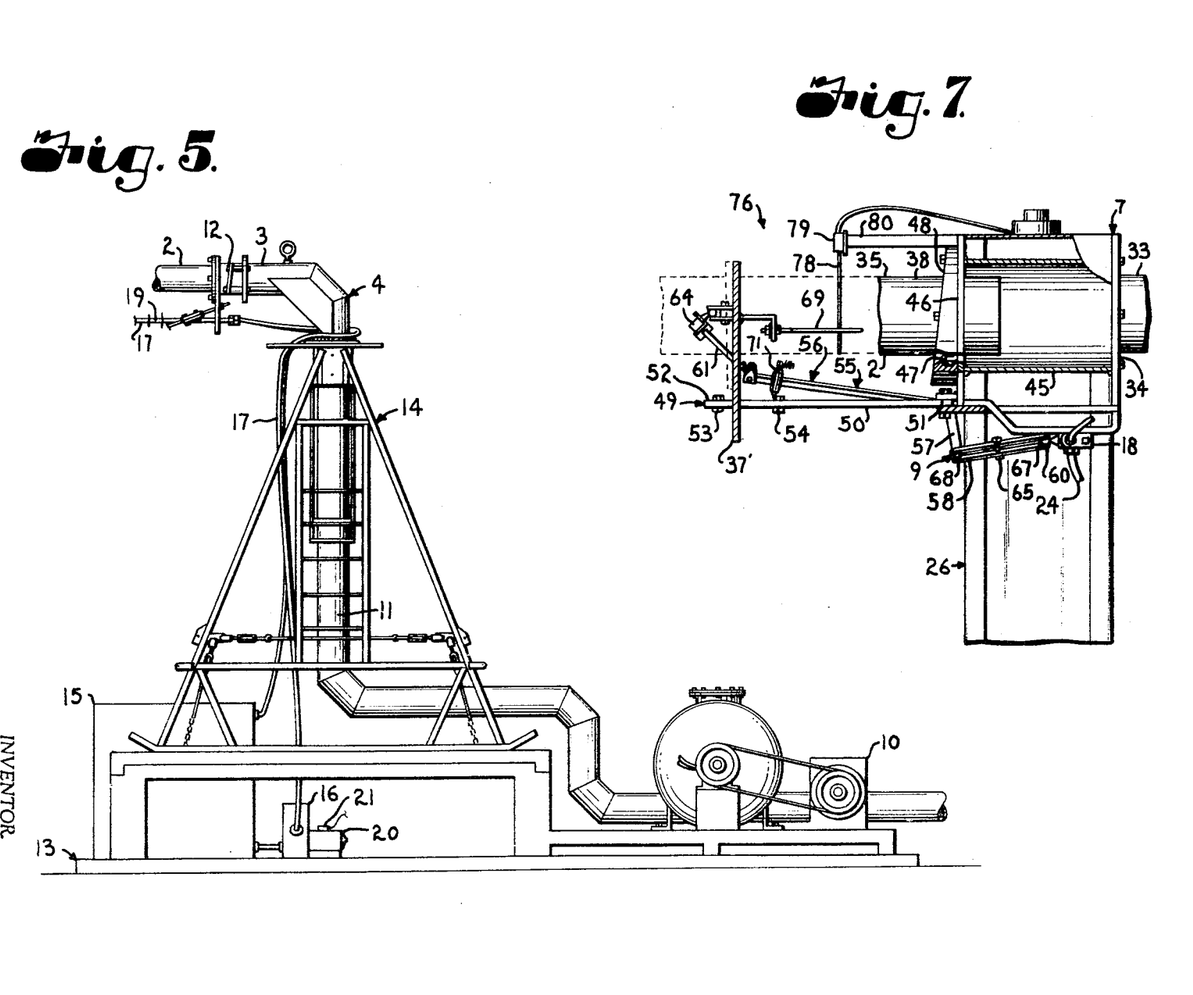
FIG. 5 is an enlarged elevational view of a swivel support structure.
FIG. 7 is a sectional view taken on line 7–7, FIG. 3, showing the control means mounted on each of the intermediate mobile units.

The central water supply pipe 3 is operatively connected to a suitable source (not shown) of irrigation fluid, such as water or water and suitable chemicals. The irrigation fluid is moved through the pipes 2 and 3 by a suitable motor-driven pump 10. The supply pipe 3 has a vertical portion 11 mounting the swivel connecting structure 4 therein with a horizontally extending top portion 12 suitably connected to the water-distribution pipe 2.

A suitable foundation 13, such as concrete, supports a framework 14 for supporting and positioning the supply pipe 3. A hydraulic fluid reservoir 15 is also supported on the foundation 13 and connected to a hydraulic pump 16 which moves hydraulic fluid or oil from the reservoir 15 through a fluid supply means comprising a fluid pressure line 17 carried on the self-propelled irrigation system 1 substantially parallel with the distribution pipe 2 for providing hydraulic fluid for driving the support units 5 and 6. The fluid under pressure is delivered to a control valve 18 at each of the intermediate mobile support units 4. A fluid return line 19 is connected to the valve 18 for flow of fluid from the drives to the reservoir 15.

The hydraulic pump 16 is a motor-driven pump wherein a motor 20 is operatively connected to the pump 16, as by suitable power-transmission members, such as belts and pulleys, or chains and sprockets. Activating means in the form of a solenoid switch 21 is associated with the motor 20 for disrupting current to the motor 20 in response to reduced fluid pressure at the respective mobile units and in response to operation of the control means 9, as later described.

The motor 20 and the hydraulic pump 16 supply fluid under pressure to the fluid pressure line 17. Fluid flows from the fluid pressure line 17 to the respective control valve 18 at each of the intermediate mobile support units 5 through a suitable conduit 22 and from the control valve 18 to a hydraulic drive motor 23 through a suitable conduit 24 with the hydraulic drive motor 23 being operatively connected to the respective mobile unit 5 for driving same. Fluid flows from the hydraulic drive motor 23 to the fluid return line 19 through a suitable conduit 25 for return to the hydraulic reservoir 15.

Figures 2, 3:
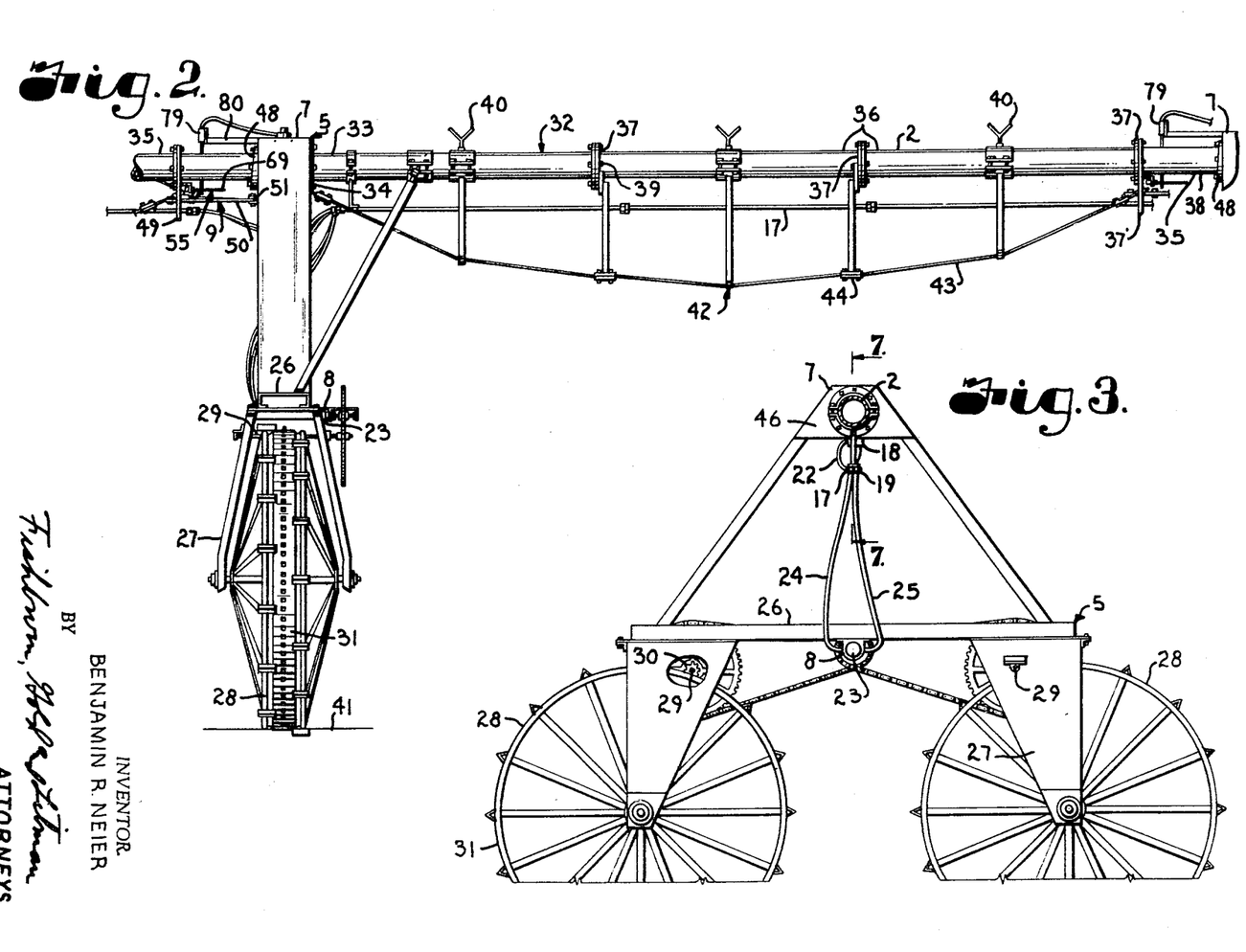
FIG. 2 is an enlarged front elevational view of an intermediate mobile support unit.
FIG. 3 is an enlarged side elevational view of the intermediate mobile support unit.
Figures 4, 8:
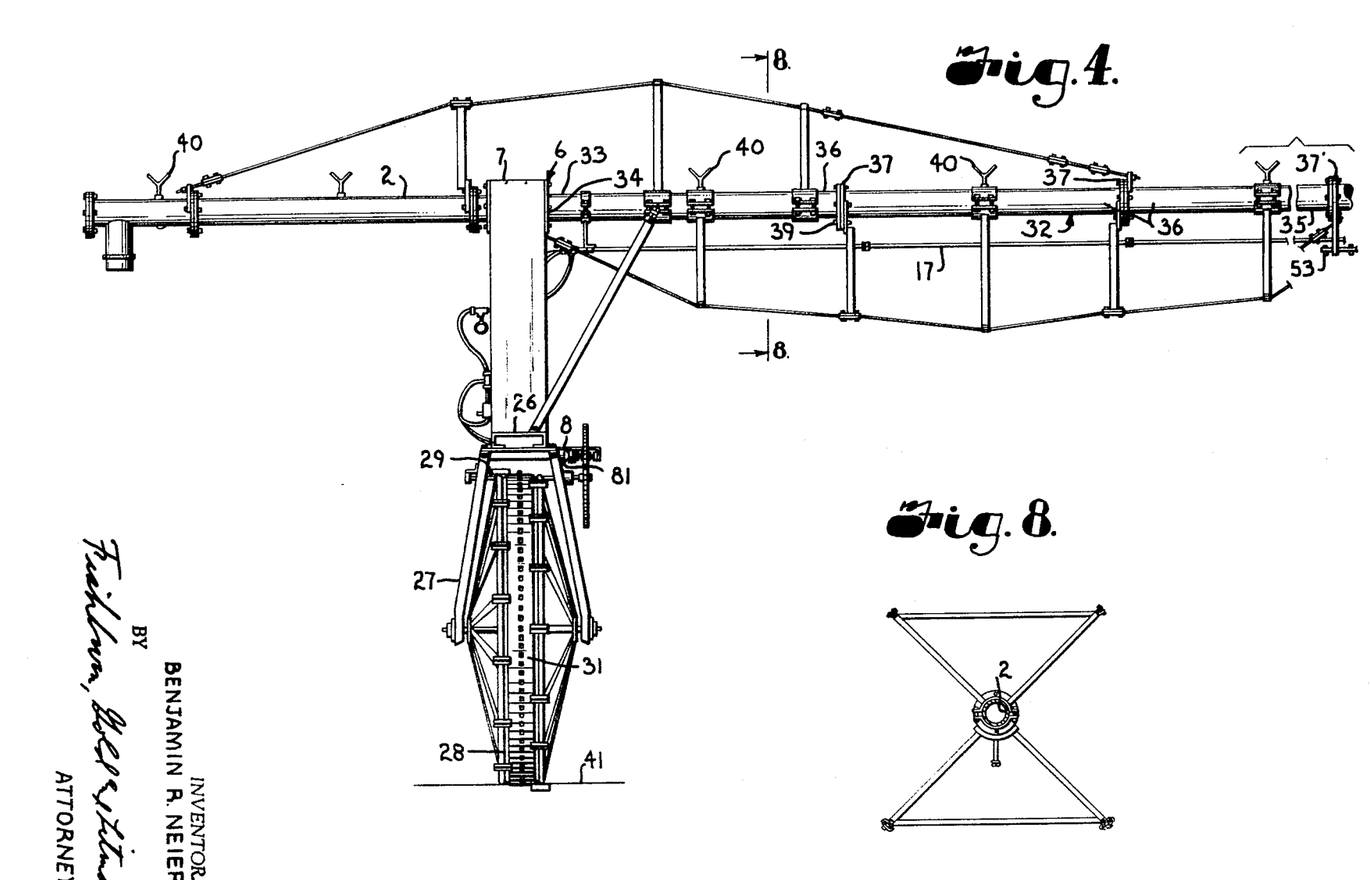
FIG. 4 is an enlarged front elevational view of an end mobile unit.
FIG. 8 is a transverse sectional view through the end unit taken on line 8–8, FIG. 4.

In the illustrated structure, each of the mobile support units 5 and 6 have an elongated frame 26 with a yoke 27 mounted on and depending from each end of the frame 26 for rotatably supporting suitable ground-engaging elements, such as wheels 28. The hydraulic drive motor 23 is operatively connected to the wheels 28 for turning same to drive the respective support unit. The drive motor 23 is operative to rotate a drive shaft which is operatively connected to driving shafts 29 as by suitable power-transmission members, such as chains and sprockets. A sprocket 30 is mounted on each of the driving shafts 29 intermediate the ends thereof and is positioned to have the teeth of the sprocket 30 enter circumferentially spaced recesses in the periphery or rim 31 of the respective wheels 28 whereby the respective mobile support unit is driven by the drive motor 23.

The water-distribution pipe 2 is formed of a plurality of elongated sections 32 each having one end 33 mounted on one side 34 of the frame 26 of the respective intermediate mobile units 5, with the respective elongated section 32 extending outwardly therefrom and having the other or free end 35 thereof movably received within the joint means 7 of the next adjacent mobile unit 5 toward the central water-supply pipe 3.

In the illustrated structure, each of the pipe sections 32 is formed of a plurality of elongated pipe lengths 36 each having a flange 37 at opposite ends. The free end 35 of the elongated pipe section 32 is formed of an end pipe 38 having a flange 37 on one end only. The pipe lengths 36 and the end pipe 38 are joined together at their flanges 37, as by bolts 39, and the flange 37 at the one end 33 of the pipe section 32 is bolted to the one side 34 of the frame 26. The total length between the ends 33 and 35 of the elongated pipe sections 32 extending from the one side 34 of the frame 26 is in the nature of 90 feet. Each of the pipe lengths has at least one sprinkler head 40 mounted therein for distributing the irrigation fluid over a ground surface 41 traveled by the self-propelled irrigation system 1.

A truss structure 42 supports the elongated section 32 and provides a substantially rigid structure which extends between the one side 34 of the frame 26 of the respective mobile support unit 5 or 6 and a connection adjacent the free end 35 of the respective elongated section 32, said connection being shown as the flange 37' fixed on the end pipe 38. The truss structure 42 has tension members 43 which are adjustably held by clamps 44. The weight of the pipe section 32 and the irrigation fluid carried therein tends to deflect the pipe section 32 downwardly which tilts the frame 26 toward the one side 34. Therefore, the tension members 43 are positioned in the clamps 44 to camber or upwardly bow the respective pipe section 32 while same is empty to thereby resist the downward deflection caused by the weight of the fluid and pipe section 32.

The mobile units 5 and 6 in the irrigation system 1 are adapted to move relative to each other by the free ends 35 of each of the elongated sections 32 being received within the joint means 7 of the respective next adjacent mobile units. In the illustrated structure, the joint means 7 includes a sleeve 45 mounted in each of the intermediate mobile support units 5 and fixed thereto. The sleeve 45 has one end communicating with the one end 33 of the respective elongated section 32 and the sleeve 45 has the other end adapted to receive the free end 35 of the elongated section 32 of a respective next adjacent mobile unit 5 or 6. The sleeve 45 has opposite ends connected to frame panels at the one side 34 and an opposite or other side 46 of the frame 26 respectively. Each of the joint means 7 includes suitable seal member 47 mounted to a seal flange 48 which is bolted on the other side 46 of the mobile unit frame 26. The seal member 47 sealingly and resiliently engages an exterior surface of the other of free end 35 of the elongated section 32 received therein.

The joint means 7 thereby provides communication between the one end 33 of the pipe section 32 supported on the respective mobile unit and the free end 35 received within the sleeve 45 carried by said mobile unit for flow of irrigation fluid therethrough. The sleeve 45 has an internal diameter substantially larger than the exterior diameter of the respective free end 35 received therein whereby the free end 35 is free to move longitudinally and angularly relative to the frame 26 of the respective mobile support unit 5.

Longitudinal movement limiting means 49 are positioned on the other side 46 of the frame 26 of each intermediate mobile support unit 5 and extend between the flange 37' of the respective elongated section 32 and said other side 46 of the frame 26 of the support unit 5 for maintaining the other or free end 35 within the sleeve 45. The longitudinal-movement-limiting means 49 is illustrated as an elongated bar 50 having one end 51 thereof pivotally mounted on the other side 46 of the frame 26 and the opposite or other end 52 thereof extending through the flange 37' with abutment portions 53 and 54 longitudinally spaced along the bar 50 and positioned on opposite sides of the flange 37', thereby limiting the longitudinal movement of the respective free or other end 35 of the elongated section 32 to the spacing between the abutment portions 53 and 54 minus the thickness of the respective flange 37'. The spacing between the abutment portions 53 and 54 permits the free end 35 to move longitudinally within the sleeve 45 while the pivotal mounting of the one end 51 of the bar 50 on the other or opposite side 46 of the frame 26 permits angular movement of the free end 35 within the sleeve 45 relative to the frame 26 all while maintaining the free end 35 within the sleeve 45.

Figure 6:
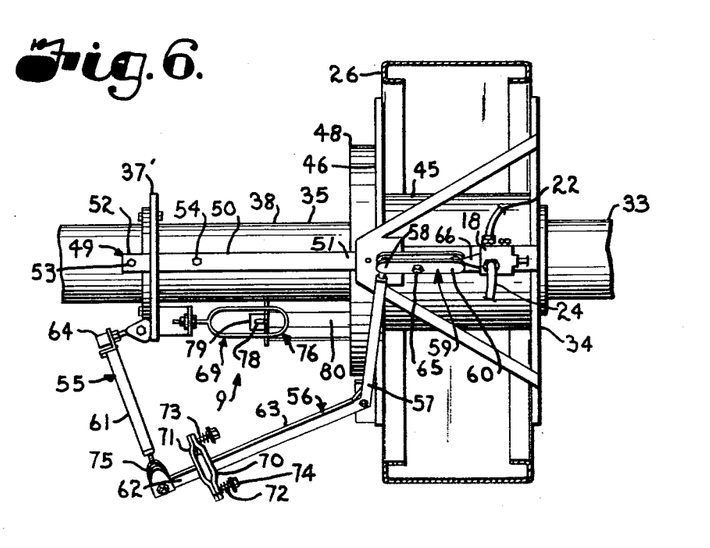
FIG. 6 is an enlarged fragmentary sectional view taken on line 6–6, FIG. 1, showing control means for controlling the travel speed of the respective mobile unit relative to adjacent mobile units of the self-propelled irrigation system.

The self-propelled irrigation system 1 is driven by the hydraulic drive motors 23 and is adapted to travel over uneven terrain with one of the support units 5 or 6 being above or below adjacent support units and with respective support units leading or trailing adjacent support units while traveling downhill or uphill respectively. It is, therefore, necessary to individually control the speed of each of the hydraulic drive motors 23 mounted on the respective intermediate mobile support units 5 to maintain the longitudinal alignment of the various elongated sections 32 of the water-distribution pipe 2 within desired limits. A portion of the control means 9 includes a control structure 55 extending between and operatively engaging the respective control valve 18 and the flange 37' adjacent the other or free end 35 of the elongated section 32 received in the sleeve 45. The control structure 55 is operative to adjust communication between the respective control valve 18 and the hydraulic drive motor 23 thereby regulating travel speed of the respective intermediate mobile unit 5 in response to movement of the flange 37' relative to the frame 26. Misalignment of the pipe 2 within limits, as later described, is thereby operative to adjust the travel speed of individual support units 5 to reestablish a desired alignment.

Each control structure 55 includes an elongated intermediate portion 56 in the form of a bellcrank pivotally mounted on the other or opposite side 46 of the respective frame 26 intermediate the ends of said intermediate portion 56. One arm 57 of the bellcrank or intermediate portion 56 is connected to one end 58 of an elongated first end portion 59 by a universal joint with the other end 60 of the first end portion 59 being operatively connected to the control valve 18 also by a universal joint, as later described. An elongated second end portion 61 has one end 62 operatively connected to the other arm 63 of the bellcrank or intermediate portion 56 and the other end 64 of the second end portion 61 is pivotally connected to the flange 37' adjacent the other or free end 35 of the elongated section 32 which is received in the joint means 7 carried by the respective mobile support unit 5.

In the illustrated structure, the first end portion 59 is a pair of bars secured together by a suitable fastening device, such as a bolt 65 intermediate the ends 58 and 60 thereof. Each control valve 18 has a plunger 66 operative to regulate the flow of fluid therethrough and one end of the plunger 66 extends outwardly from the control valve 18 and terminates in a ball or spherical portion roatably received within recesses 67 in facing surfaces of the other end 60 of each of the parallel bars forming the first end portion 59 thereby forming the universal joint. The end of the one arm 57 of the bellcrank or intermediate portion 56 is also illustrated as a ball or spherical member received in recesses 68 in the facing surfaces of the one end 58 of each of the parallel bars forming the first end portion 59 of the control structure 55 thereby forming the universal joint between the arm 57 of the bellcrank 56 and the first end portion 59.

It is desirable to have a resilient connection between the other arm 63 of the intermediate portion or bellcrank 56 and the second end portion 61 of the control structure 55 whereby movement of the flange 37' beyond limits of a loop member 69, as later described, is not transmitted to the control valve 18. In the illustrated structure, a bowed plate 70 is suitably secured to the end of the other arm 63 of the bellcrank or intermediate portion 56, as by welding, and a bowed plate 71 is suitably secured to the one end 62 of the second end portion 61, as by welding, with the plates 70 and 71 is suitably secured to the one end 62 of the second end portion 61, as by welding, with the plates 70 and 71 having engaging end portions. Threaded studs 72 are mounted on the opposite end portions of one of the plates, as for example, plate 71 and extend through the opposite ends of the other bowed plate 70. A suitably resilient member, such as a spiral spring 73, is sleeved on each of the threaded studs 72 and positioned between suitably tightening or adjustment devices, such as nuts 74, and the bowed plate 70 which is secured to the intermediate portion 56. The springs 73 permit the bowed plates 70 and 71 to separate in the event that the flange 37' moves beyond limits of the control structure 55 whereby the control structure 55 will not be permanently deformed or damaged.

The second end portion 61 has a universal joint 75 intermediate the ends thereof to cooperate with the universal joints at the opposite ends 58 and 60 of the first end portion 59 thereby permitting limited angular movement of the flange 37' relative to the respective frame 26 without adjusting the plunger 66 of the respective control valve 18. It is noted that the bellcrank 56 is limited to movement in a single plane while the respective flange 37' may traverse a full circle and move longitudinally toward and away from the respective frame 26. Movement of the bellcrank 56 is communicated to the control valve 18 through the universal joints at the ends 58 and 60 of the first end portion 59.

The joint means 7 is adapted to permit longitudinal extension and contraction of the distribution pipe 2 at each of the intermediate mobile support units 5 while leading or trailing adjacent support units. A switch means 76 is carried by each of the intermediate mobile support units 5 and operatively connected to the solenoid valve 21 at the motor 20 driving the hydraulic pump 16 to stop same in response to longitudinal extension or contraction and misalignment of the distribution pipe 2 beyond selected limits.

In the illustrated structure, the loop member 69 is mounted on and extends outwardly from each of the flanges 37' adjacent the other or free end 35 of the respective elongated sections 32. The loop member 69 is illustrated as formed of a pair of parallel side bars connected at their ends by semicircular end bars thereby defining an elongated area of permitted transverse and longitudinal movement between adjacent support units, with the spacing between the side bars of the loop defining the limits of permitted transverse movement of the respective other of free end 35 of the sections 32.

A trip member 78 is operatively connected to the solenoid 21 and is mounted on each intermediate mobile support unit 5 and positioned to extend into the respective loop member 69 whereby the trip member 78 will engage said loop member 69 in response to movement of the respective elongated section 32 beyond the limits of the respective loop member 69 thereby stopping the motor 20 driving the pump 16. In the illustrated structure, each trip member 78 activates a switch 79 electrically connected to the solenoid valve 21 with the switch 79 and trip member 78 being supported on an arm 80 suitably secured to and extending outwardly from the frame 26 in a position substantially parallel with and above the free end 35 of the respective elongated section 32.

The end mobile support unit 6 supports an elongated section 32 extending toward the central water supply pipe 3 with the free end 35 thereof received in the sleeve 45 of the adjacent intermediate mobile support unit 5. The end mobile support unit 6 has a driving hydraulic motor 81 connected to the fluid pressure line 17 and the fluid return line 19. However, the end mobile support unit 6 does not have joint means 7 or control means 9 to regulate the speed of the hydraulic drive motor 81 or to stop the motor 20.

The travel speed of the self-propelled irrigation system 1 around the vertical portion 11 of the central water-supply pipe 3 as an axis is determined by the travel speed of the hydraulic drive motor 81 which is adjusted to the desired travel speed of the system 1. The necessary adjustments in travel speed of the individual intermediate mobile support units 5 are accomplished to conform to the travel speed of the end mobile support unit 6.

In use, the pump 16 is started to move fluid to the drive motors 23 and 81 at the intermediate support units 5 and the end support unit 6 respectively, thereby moving the system 1 around the supply pipe 3. The pump 10 is then started to supply irrigation fluid to the sections 32 of the pipe 2. As the system 1 travels around the supply pipe 3, various support units 5 will move toward and away from adjacent units and will lead and trail adjacent units and will be above and below adjacent units thereby moving their respective flange 37' relative to the frame 26 of the next adjacent unit 5. The control structures 55 convey the movement of the flange 37' to the respective control valve 18 to vary the speed of the drive motor 23 driving the respective support unit 5 to allow other units to catch up with same or to permit same to catch up with other units. The speed of the drive motor 81 controls the travel speed of the end unit 6 and thereby controls the speeds of the intermediate support units 5.

It is to be understood that, while I have illustrated and described one form of my invention, it is not to be limited to the specific form or arrangement of parts herein described and shown.

What I claim and desire to secure by Letters Patent is:
1. A self-propelled irrigation system comprising:
   a. a plurality of laterally spaced intermediate mobile support units and an end mobile support unit arranged along a line;
   b. an elongated water distribution pipe defining said line and carried by said intermediate and end mobile units, said water-distribution pipe being formed of a plurality of elongated sections, each of said intermediate support units having one end of a respective pipe section fixed on one side thereof and extending outwardly therefrom;
   c. a central water-supply pipe connected to a water source;
   d. swivel means connecting said distribution pipe to said central supply pipe;
   e. hydraulic drive means carried by each of said intermediate and end mobile support units and operatively connected thereto for moving said distribution pipe around said central supply pipe as an axis;
   f. first motor means for supplying water to said distribution pipe;
   g. second motor means for supplying hydraulic fluid under pressure to said respective drive means;
   h. joint means at the other side of each of said intermediate mobile support units from said respective pipe sections, said joint means movably receiving the free end of the pipe section fixed to the next adjacent support unit and permitting relative movement of said free end and increasing and decreasing the spacing between said pipe section free end and the end of the pipe section fixed to the respective support unit at which the joint means is located, said relative movement permitting said mobile support units to move laterally relative adjacent support units and to lead and trail adjacent support units and permitting radial extension and contraction of said distribution pipe at each of said intermediate mobile units, said joint means communicating adjacent sections of said distribution pipe for flow of irrigation fluid therethrough;
   i. first control means carried by each of said intermediate mobile support units and responsive to said movement of said free end of said respective distribution pipe section at said joint means for controlling said respective drive means; and
   j. second control means carried by each of said intermediate mobile units and responsive to radial extension and contraction of said distribution pipe beyond selected limits for stopping said second motor means.

2. A self-propelled irrigation system comprising:
   a. a central supply pipe connected to a source of irrigation fluid;
   b. an elongated distribution pipe connected to said central supply pipe, said distribution pipe being formed of a plurality of elongated sections;
   c. a plurality of intermediate mobile support units and an end mobile support unit longitudinally spaced along said distribution pipe for support thereof, each of said intermediate support units having one end of a respective pipe section fixedly mounted on one side thereof and extending outwardly therefrom;
   d. drive means for driving said intermediate and end mobile units for moving said distribution pipe around said central supply pipe as an axis, said drive means including a source of hydraulic fluid under pressure, a control valve at each intermediate mobile unit, said control valve communicating with said fluid under pressure, a hydraulic motor at each mobile unit, said hydraulic motor communicating with said fluid under pressure, said hydraulic motor at said intermediate mobile units communicating with said respective control valve, each of said hydraulic motors being operatively connected to said respective mobile units for driving same;

e. joint means associated with said distribution pipe at each of said intermediate mobile units for permitting controlled movement of said distribution pipe at each of said intermediate mobile units, said joint means movably receiving the other end of the pipe section extending from an adjacent support unit thereby permitting each of said mobile support units to move laterally of and lead and trail adjacent support units;

f. control means associated with each of said intermediate mobile units for controlling said drive means in response to movement of said distribution pipe at said respective intermediate mobile units;

g. said joint means permitting longitudinal extension and contraction of said distribution pipe;

h. said control means including a motor-driven pump for providing said pressure to said hydraulic fluid, activating means associated with said motor-driven pump for activating means to stop said motor-driven pump for activating means to stop said motor-driven pump in response to movement to said mobile support units beyond selected limits, and switch means at each mobile unit operatively connected to said activating means at said motor-driven pump for activating same in response to longitudinal extension and contraction of said distribution pipe beyond selected limits; and i. said switch means including a loop member mounted on a flange adjacent the other end of a pipe section extending from each of said support units, a trip member mounted on each of said respective intermediate mobile units and positioned within said respective loop member whereby said trip member will engage said loop member in response to movement of said distribution pipe beyond the limits of said loop member thereby stopping said motor-driven pump.

3. A self-propelled irrigation system comprising:

a. a plurality of laterally spaced intermediate mobile support units and an end mobile support unit arranged along a line;

b. an elongated water-distribution pipe defining said line and carried by said intermediate and end mobile units, said water-distribution pipe defining said line and carried by said intermediate and end mobile units, said water-distribution pipe being formed of a plurality of elongated sections, each of said intermediate support units having one end of a respective pipe section mounted on one side thereof and extending outwardly therefrom;

c. a central water-supply pipe connected to a water source;

d. swivel means connecting said distribution pipe to said central supply pipe;

e. hydraulic drive means carried by each of said intermediate and end mobile support units and operatively connected thereto for moving said distribution pipe around said central supply pipe as an axis;

f. first motor means for supplying water to said distribution pipe;

g. second motor means for supplying hydraulic fluid under pressure to said respective drive means;

h. joint means at each of said intermediate mobile support units for movably receiving the other end of the pipe section extending from an adjacent support unit thereby permitting said mobile support units to lead the trail adjacent support units and permitting radial extension and contraction of said distribution pipe at each of said intermediate mobile units;

i. first control means carried by each of said intermediate mobile support units and responsive to said movement of said other end of said respective distribution pipe section at said joint means for controlling said respective drive means;

j. second control means carried by each of said intermediate mobile units and responsive to radial extension and contraction of said distribution pipe beyond selected limits and responsive to misalignment beyond selected limits for stopping said second motor means;

k. distribution pipe sections each having a flange adjacent the other end thereof with the other end thereof being received within a sleeve at each respective intermediate mobile unit;

l. said first control means has an elongated control structure having one end operatively connect to a control valve carried by said respective intermediate mobile unit and another end pivotally connected to a flange mounted adjacent the other end of a pipe section extending from an adjacent mobile unit and having the other end thereof movably received within a sleeve carried by said respective intermediate mobile unit, said control arm being adapted to transmit movement of said flange to said control valve; and m. said second control means is a switch carried by said respective intermediate mobile unit, said switch being operatively connected with said second motor means, said second control means having a trip member mounted on said respective intermediate mobile unit and positioned within a loop member mounted on said flange whereby said trip member will engage said loop member in response to movement of said flange beyond the limits of said loop member thereby stopping said second motor means.

4. A self-propelled irrigation system comprising:

a. an elongated distribution pipe for carrying irrigation fluid, said distribution pipe being formed of a plurality of elongated sections;

b. a plurality of spaced apart intermediate mobile support units and an end mobile support unit for movably supporting said distribution pipe, each of said intermediate support units having one end of a respective pipe section fixed on one side thereof and extending outwardly therefrom;

c. joint means at the other side of each of said intermediate mobile support units from said respective pipe sections, said joint means movably receiving the free end of the pipe section fixed to the next adjacent support unit and permitting relative movement of said free end and increasing and decreasing of spacing between said pipe section free end and the end of the pipe section fixed to the respective support units at which the joint means is located, said relative movement permitting each of said mobile support units to move laterally relative adjacent support units and to lead and trail adjacent support units carrying said distribution pipe therewith, said joint means communicating adjacent sections of said distribution pipe for flow of irrigation fluid therethrough;

d. drive means operatively connected to each of said intermediate and end support units for driving same; and e. control means associated with each of said joint means and responsive to movement of said free end of the pipe sections toward and away from and angularly relative to said respective next adjacent support unit for controlling the drive means of said next adjacent support units.

5. The self-propelled irrigation system as set forth in claim 1 wherein said drive means includes:

a. a drive motor at each of said support units and operatively connected thereto;

b. fluid pressure lines carried adjacent the distribution pipe for providing hydraulic fluid under pressure;

c. a control valve at each of said intermediate mobile support units, said control valves each being connected to said fluid pressure lines; and d. fluid flow means at each of said intermediate mobile support units communicating said respective control valves with said respective drive motors.

6. The self-propelled irrigation system as set forth in claim 5 wherein said control means includes:
a. an elongated control structure having one end operatively connected to said respective control valve and the other end operatively connected to the section of the distribution pipe adjacent the free end received in said respective joint means whereby movement of said free end of the pipe sections toward and away from and angularly relative to said next adjacent support unit is communicated to said respective control valve.

7. A self-propelled irrigation system comprising:
a. an elongated distribution pipe for carrying irrigation fluid, said distribution pipe being formed of a plurality of elongated sections;
b. a plurality of spaced apart intermediate mobile support units and an end mobile support unit for movably supporting said distribution pipe, each of said intermediate support units having one end of a respective pipe section mounted on one side thereof and extending outwardly therefrom;
c. joint means associated with said distribution pipe at each of said intermediate mobile support units for permitting each of said intermediate mobile support units to move toward and away from adjacent mobile support units;
d. a drive motor operatively connected to each of said intermediate and end mobile support units for driving same, said drive motor at each of said support units being a hydraulic motor;
e. power means operatively connected to each of said drive motors for supplying power thereto, said power means being a motor-driven pump for supplying hydraulic fluid under pressure to each of said respective hydraulic-drive motors;
f. control means associated with each of said joint means for stopping said power means in response to a predetermined limit of said movement of said respective support unit toward and away from adjacent support units;
g. said control means including activating means dissociated with said motor-driven pump for starting and stopping same, and switch means associated with each of said intermediate mobile support units, each of said switch means being operatively connected to said activating means for stopping said motor-driven pump in response to said movement longitudinally of said respective intermediate mobile support units with respect to adjacent mobile support units beyond selected limits; and
h. each of said sketch means including a loop member mounted on the elongated section of the distribution pipe adjacent the other end thereof, and a trip member mounted on said respective adjacent intermediate mobile support unit and positioned within said loop member, said member being operatively connected to said activating means for stopping said motor-driven pump upon engagement of said trip member with said loop member.

8. The self-propelled irrigation system as set forth in claim 7 wherein said joint means permit each of said intermediate mobile support units to lead and trail adjacent support units carrying said distribution pipe therewith, said control means including:
a. a control valve carried on each of said intermediate mobile support units and operatively connected to said drive motor thereon and to said power means; and
b. an elongated control structure extending between and operatively connected to said respective other end of said elongated section of said distribution pipe extending from an adjacent support unit and said control valve for regulating said respective drive motor thereby regulating travel speed of said respective intermediate mobile support unit.

9. The self-propelled irrigation system as set forth in claim 8 wherein each of said control structures includes:
a. an elongated first end portion having one end thereof operatively connected to said respective control valve, said control valve connection being a universal joint;
b. an elongated bellcrank pivotally mounted on the other side of said respective mobile support unit intermediate its ends, one end of said bellcrank being operatively connected to the other end of said first end portion, said bellcrank connection being a universal joint; and
c. an elongated second end portion having a universal joint intermediate its ends, one end of said second end portion being pivotally mounted adjacent said other end of said respective distribution pipe section of an adjacent support unit, another end of said second end portion being resiliently connected to the other end of said bellcrank.

10. A self-propelled irrigation system comprising:
a. a central supply pipe connected to a source of irrigation fluid;
b. an elongated distribution pipe connected to said central supply pipe, said distribution pipe being formed of a plurality of elongated sections;
c. a plurality of intermediate mobile support units and an end mobile support unit longitudinally spaced along said distribution pipe for support thereof, each of said intermediate support units having one end of a respective pipe section fixedly mounted on one side thereof and extending outwardly therefrom;
d. drive means for driving said intermediate and end mobile units for moving said distribution pipe around said central supply pipe as an axis, said drive means including a source of hydraulic fluid under pressure, a control valve at each intermediate mobile unit, said control valve communicating with said fluid under pressure, a hydraulic motor at each mobile unit, said hydraulic motor communicating with said fluid under pressure, said hydraulic motor at said intermediate mobile units communicating with said respective control valve, each of said hydraulic motors being operatively connected to said respective mobile units for driving same;
e. joint means associated with said distribution pipe at each of said intermediate mobile units for permitting controlled movement of said distribution pipe at each of said intermediate mobile units, said joint means movably receiving the other end of the pipe section extending from an adjacent support unit thereby permitting each of said mobile support units to move laterally of and lead and trail adjacent support units;
f. control means associated with each of said intermediate mobile units for controlling said drive means in response to movement of said distribution pipe at said respective intermediate mobile units; and
g. each of said pipe sections having a flange adjacent the other end thereof, each of said control means including an elongated control structure having one end operatively connected to said control valve, and a flange adjacent the other end of a respective pipe section will be received within said joint means at said respective intermediate mobile unit and having another end of said control structure connected thereto whereby movement of said flange relative to the respective mobile unit adjusts communication between said control valve and said respective hydraulic motor thereby regulating travel speed of said respective intermediate mobile unit.

11. The self-propelled irrigation system as set forth in claim 10 wherein said control structure includes:
a. an elongated intermediate portion pivotally mounted on the other side of said respective mobile support unit, said pivotal mounting being intermediate the ends of said intermediate portion;
b. an elongated first end portion having one end pivotally connected to one end of said intermediate portion and the other end operatively connected to said control valve on said respective intermediate mobile unit; and
c. an elongated second end portion having one end connected to another end of said intermediate portion and the other end pivotally connected to said flange on said respective pipe section.

12. The self-propelled irrigation system as set forth in claim 11 wherein:
a. said second end portion has a universal joint therein intermediate the ends thereof; and
b. said connection of said one end of said second end portion to said other end of said intermediate portion is a resilient connection whereby movement of said flange beyond selected limits is not transmitted to said control valve.

13. The self-propelled irrigation system as set forth in claim 11 wherein:
a. said intermediate portion of said control structure is a bellcrank;
b. said pivotal connection of said one end of said bellcrank to said one end of said first end portion is a universal joint; and
c. said operative connection of said other end of said first end portion to said control valve is a universal joint.